March 7, 1950 W. A. GORDON 2,499,913
MACHINE FOR TREATING RUBBER
Filed Nov. 9, 1945 4 Sheets-Sheet 1
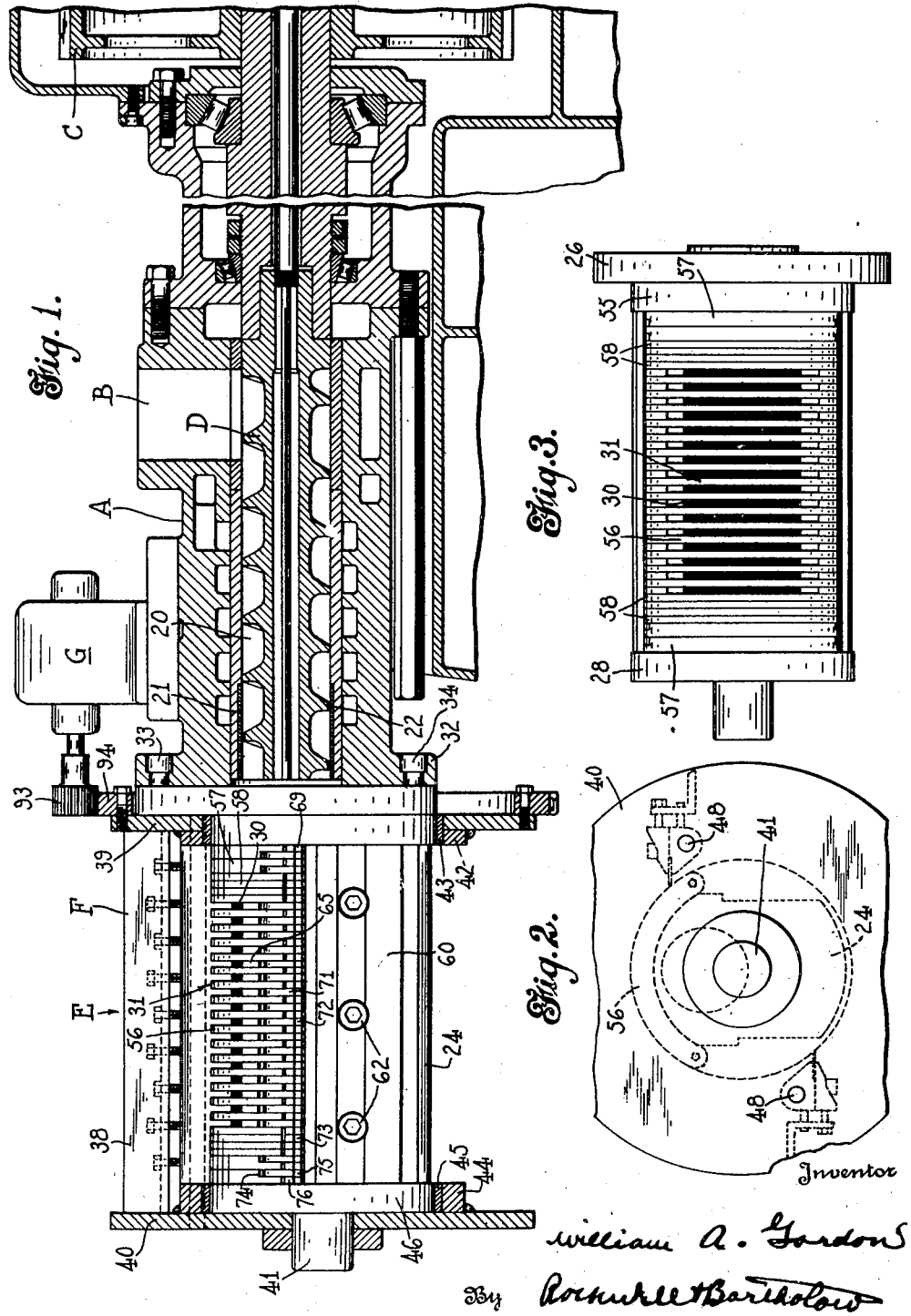
Inventor
William A. Gordon
By Rockwell Bartholow
Attorneys

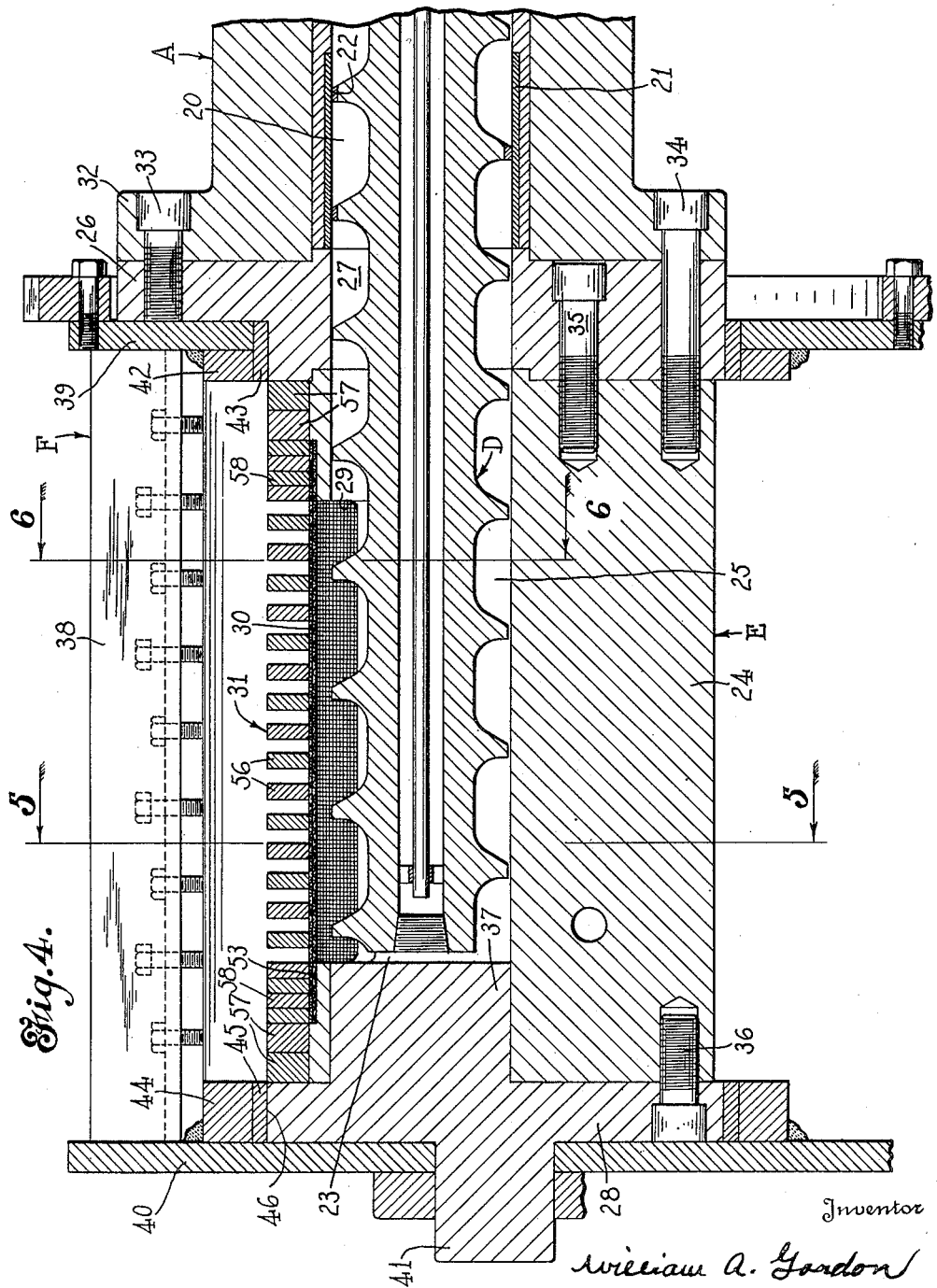

March 7, 1950 W. A. GORDON 2,499,913
MACHINE FOR TREATING RUBBER
Filed Nov. 9, 1945 4 Sheets-Sheet 3
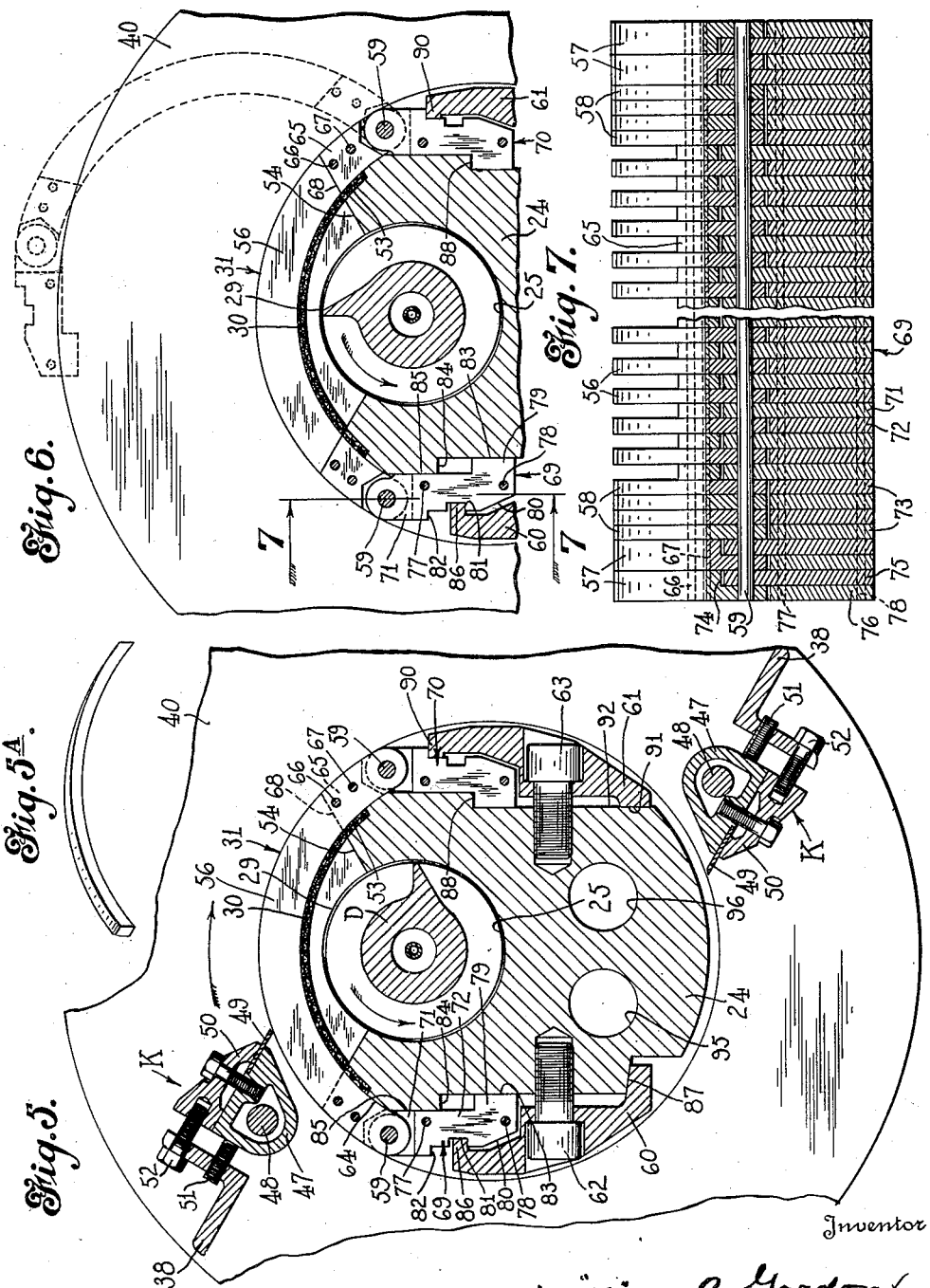

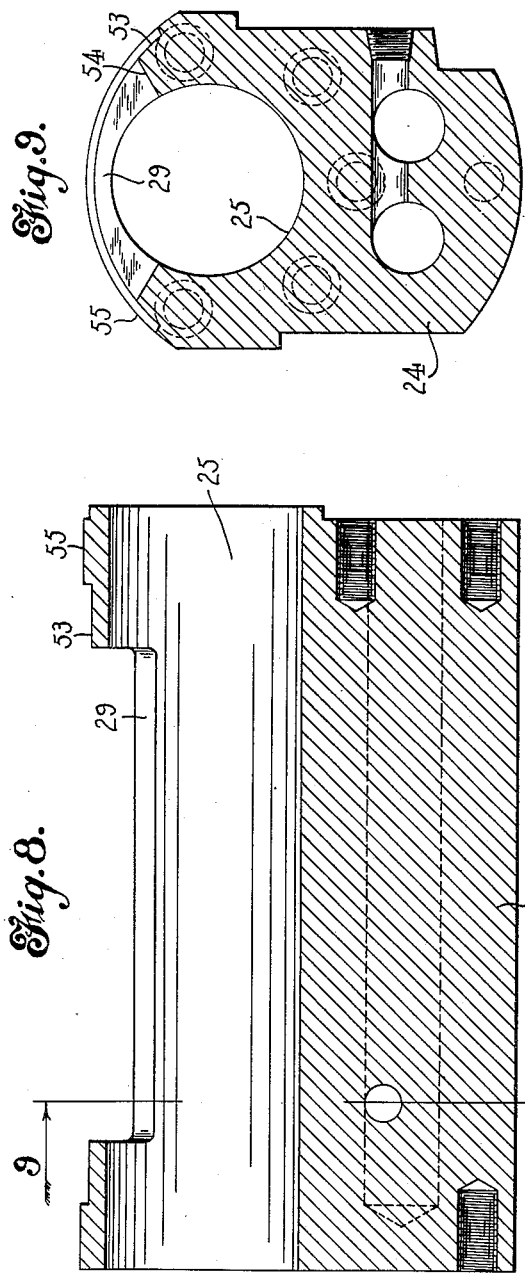
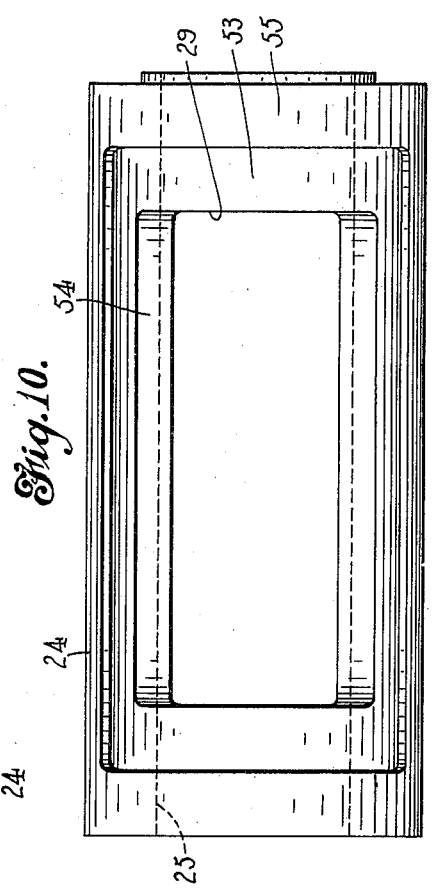

Patented Mar. 7, 1950

2,499,913

UNITED STATES PATENT OFFICE 2,499,913

MACHINE FOR TREATING RUBBER

William A. Gordon, Shelton, Conn., assignor to Farrel-Birmingham Company, Inc., Ansonia, Conn., a corporation of Connecticut Application November 9, 1945, Serial No. 627,757

14 Claims. (Cl. 18—12)

This invention relates to means for treating rubber, and it has particular reference to the straining of a mass of rubbery material by forcing it through a screen so as to remove dirt and foreign bodies.

It has been proposed in the past to strain rubber by forcing it through a screen arranged within a perforated cylindrical wall, but in the apparatus previously used there have been many practical objections which it is the aim of the present invention to overcome.

One of the objects of the present invention is to facilitate to a considerable extent the removal and replacement of a screen. The screens become soiled and clogged so that frequent replacement is desirable, and it is very desirable that replacement be accomplished with maximum quickness and convenience.

Another object of the invention is to insure against leakage of the rubber around the marginal portion of a removable screen, because such leakage is quite objectionable.

Another object is to provide a simple, compact and durable form of rubber-straining machine or extruder.

In the accompanying drawings:

Fig. 1 is a view partly in side elevation and partly in longitudinal section and partly broken away, illustrating a preferred form of machine used in the carrying out of the invention;

Fig. 2 is a fragmentary end view looking toward the left-hand end in Fig. 1;

Fig. 3 is a top plan view of the straining section of the machine, the rotating knives being omitted:

Fig. 4 is a vertical longitudinal section of a portion of the machine on a larger scale;

Fig. 5 is a section on line 5—5 of Fig. 4;

Fig. 5<sup>A</sup> is a detail perspective view of one of the strips or strings produced by the machine shown;

Fig. 6 is a section on line 6—6 of Fig. 4, the cutting means being omitted;

Fig. 7 is an enlarged section on line 7—7 of Fig. 6;

Fig. 8 is a detail longitudinal section of the body of the strainer portion;

Fig. 9 is a section on line 9—9 of Fig. 8; and

Fig. 10 is a top plan view of the body.

In the form shown in the drawings, the machine comprises a main section and a strainer section. The main section is provided with a hopper in which the material to be treated is received, and with a forcing screw which moves the material longitudinally into the strainer section, the forcing screw being extended so as to lie within the strainer section and to be operable to force the rubber through the screen with which the strainer section is provided. The strainer section is connected to the main section at the discharge end of the main section, and at the opposite end of the main section are the provisions for driving the screw. The strainer section at the exterior is of generally cylindrical shape and the screen is associated with the circumferential portion of the cylinder thus provided, and about the generally cylindrical structure referred to a knife cage is revoluble for the purpose of cutting off the rubber which is forced out through the screen, the knife cage being provided in this instance with diametrically located knives extending parallel to the axis of rotation of the cage. Suitable means are also provided for rotating the knife cage about the generally cylindrically shaped structure in which the discharge end of the screw operates.

In the drawings, the main section of the machine is indicated generally at A, the feed hopper at B, and at C is indicated the driving means for the feed screw D. The strainer section is generally indicated at E, the same including a rotary knife cage generally indicated at F, said cage being rotated by means such as an electric motor G. As will be seen from Fig. 4, the screw D is extended so as to project into a chamber with which section E is provided, and so as to be operable to force the rubber through a screen with which this section is provided.

Referring now to the details, it will be seen that within the main section A the feed screw operates in a chamber 20, within the left-hand portion of which (Figs. 1 and 4) is located a liner 21 of hard material making contact with peripheral portions 22 of hard material with which the feed screw is provided in this region, so as to give close and effective bearing to the screw in its rotation. Thus it is possible to project the feed screw into the straining chamber and use this portion of the screw for expelling the rubber without the necessity of giving support to the left-hand end (Fig. 4) of the screw. Such end may, therefore, be spaced from the adjacent end of the straining chamber, as indicated at 23.

The strainer section E includes in its stationary casing portion a body 24 having a chamber or cavity 25 which provides the main portion of the strainer chamber. This section also includes a flange portion 26 having a chamber or cavity 27, and it further includes a head 28 which closes the left-hand end (Fig. 4) of the strainer chamber. The body 24 has a window 29 over which is supported a screen 30, and over the screen 30 lies a grid, generally indicated at 31, which holds the screen in place and provides a plurality of openings through which the rubber is forced. The rubber issuing from these openings is cut off by the knives carried by knife cage F.

At the discharge end of the main section A the casing is formed with a flange 32, and to this flange is secured, by means such as screws 33 and 34, the flange element 26 previously mentioned, which flange element has a cavity forming a part of the rotor cavity. As will be noted from Fig. 4, the screws 34 are instrumental in assembling body 24 to the flange 26. Additional means such as screws 35 are used for securing the body to the flange. Means such as screws 36 are used for fastening the head 28 to the body 24. Preferably this head 28 has a boss or extension 37 extending into the cavity running through the body 24, the inner face of the boss 37 defining the left-hand end of the strainer chamber (Fig. 4), and this end surface being in line with the adjacent boundary of the window 29, previously mentioned.

The knife cage F, previously mentioned, includes in its structure diametrically located longitudinal angle bars 38 joined at one end to a ring 39 and at the opposite end to a disk 40. The disk 40 is apertured and arranged to revolve about a cylindrical extension 41 on head 28. The ring 39, on the other hand, is arranged to revolve about a cylindrical portion of the flange 26. The ring 39 is fastened to an adjacent smaller ring 42 and within the two members a liner 43 is made fast, this liner bearing on the cylindrical portion of flange 26 which is concentric with the axis of rotation of the knife cage. Similarly, disk 40 is made fast to a ring 44 having an inner liner 45 bearing on the peripheral portion 46 of head 28, which peripheral portion is concentric with the axis of the knife cage. The knife cage axis is located below the center of the strainer chamber 25, as appears from Fig. 2, and the knife cage rotates about a substantially cylindrical body provided in part by the body 24 and in part by the grid 31, as hereinafter described.

The bars 38 of the knife cage support knives which operate adjacent the external surfaces of the grid 31. These knives are generally indicated at K, and they may be of the structure described in my copending application Serial No. 602,245, filed June 29, 1945, now Patent No. 2,422,480. As described in that patent, each knife K may include a longitudinal member 47 adapted to swing about a longitudinal bar 48 and having a knife blade 49 clamped thereto by a cap member 50. The knife may be swung in one direction by screws 51, and in the opposite direction by screws 52.

In the particular form shown here, the screen 30 is shown as comprising, by way of example, two planar layers of foraminous material which are placed in arcuate shape over the window 29 and clamped in place by the grid 31. Extending around the window is a seat 53 formed in the body 24 and presenting a surface of cylindrical shape in which the marginal portion of the screen is inserted, and then clamped by means of the grid. The grid in the present form comprises a number of curved transverse members disposed over the body 24 through substantially the length of said body, and the grid also comprises a plurality of depending locking members which are fastened to the ends of the several transverse members in a manner to form elements of the grid-like structure. The grid-like structure is removably held in place, preferably by longitudinal clamping elements or bars arranged along the sides of the body 24 in the manner hereinafter described.

As appears from Fig. 5, for example, the window 29 provided in the upper part of the strainer chamber 25 is preferably extended through substantially 120° of the chamber periphery, although variation may be made in this respect, and the side surfaces of the window, that is to say, the parts below the screen, are arranged in planes radial to the strainer chamber, as indicated at 54. The structure of the body 24 is such as to enable the screen to be set flush with its upper cylindrical surface 55, which surface has a radius substantially larger than that of the strainer chamber. It is essential that there be no leakage of rubber past the marginal portions of the screen which are set in the seat 53, and for this purpose the screen is overlain by the transverse elements of the grid 31, which elements are carefully made so as to have inner curved surfaces conforming precisely to the curvature of the body 24 and the inset screen.

The grid 31 in the case shown comprises a group of arcuate members of the nature of strips or plates extended transversely over the screened opening or window and presented edgewise to the screen to hold it in place, these strips being indicated at 56. These strips provide transverse slots extending the full width of the window through which the discharging rubber passes. The slots may have a width of ¼ of an inch, but this dimension is given merely by way of example. In addition to the strips 56, the grid includes other strips or elongated members arranged over the ends of the body 24, as shown in Fig. 4. These additional members include in this case two relatively wide members 57 engaged with the cylindrical surface of the body 24, and four relatively narrow members 58 engaged with the screen over those portions of the screen that are seated in the seat 53. The portions 57, 58 of the grid consist of members having their side faces in close abutment so as to present in effect a solid cover from one end boundary of the window up to the flange member 26, and from the opposite boundary of the window up to the body of the head 28. All of the members 56, 57 and 58 are interconnected at the respective sides of the grid by rods 59 acting as pintles, said rods also serving for the pivotal connection of the depending locking members mentioned above. The depending locking members are formed as hereinafter described, and are adapted to be clamped in place by locking bars clamped against the respective sides of the body 24. As best shown in Fig. 5, there is a locking bar 60 on one side of the body, and a locking bar 61 at the opposite side, these bars being held in place, respectively, by a series of screws 62 and a series of screws 63. As will be seen in Fig. 5, the curved transverse members of the grid are extended laterally for some distance beyond the lateral edges of the screen, engaging in that region the cylindrical surface provided upon the body 24. There is a close fit in this region against the body, and the region is indicated at 64. Laterally beyond this region (Fig. 5) the body 24 is slabbed off to receive the pintles 59 and the locking parts depending therefrom, and also the clamping bars 60 and 61. Moreover, the sides of the body 24 are shaped to receive portions of the locking members carried by the grid.

At the ends of the slots through the grid, short spacers 65 are provided, these spacers being engaged with the pintles 59 by perforations through the spacers, and these spacers are also engaged by longitudinal tying elements such as wires 66 and 67 extending through the length of the grid. The spacers 65 have upper edges 68, which are in line with the surfaces 54 at the sides of the window.

At the left-hand ends of the strips 56 (Fig. 5) are depending locking members 69, and at the opposite ends of these strips are somewhat similar depending locking members 70. The locking members 69 are of duplex structure, as shown in Fig. 7, including a long spacer member 71 engaging the pintle 59 and positioned between two adjacent strips 56, and also including a short member 72 filling the space between two adjacent parts 71. There are no spaces between the several elements 58 of each group, and consequently these elements have locking elements 73 positioned directly below them. The relatively wide elements 57, on the other hand, are cut away at their end portions where they engage the pintle, as indicated at 74, and each such cut-away portion is engaged by a part 75 of a locking element having an additional part 76 located at one side thereof, as appears in Fig. 7.

All of the parts 71, 72, 73, 75 and 76 which have just been described are tied together by longitudinal connecting members such as wires 77 and 78, and preferably all of them are profiled in the same manner as the part 72 shown at the left of Fig. 5. Preferably also the locking members 70 employed at the opposite side of the straining chamber are of the same construction as has just been described, and they have the same profile as the members 69, as will now be described. Each of these members 69 has at the lower part an inward projection 79 provided with squared-off upper and lower shoulders, and at the lower outer part the locking member has a chamfered surface 80. Somewhat above the chamfered surface 80 the member is provided at the outer side with a small squared notch 81. Immediately above the notch 81 the locking member is provided at the outer side with an angular recess 82 presenting a downwardly facing shoulder.

In the case of the left-hand depending locking members (Fig. 5), the projection 79 is engaged flatwise against a side surface 83 on body 24, the engagement being at some distance below a shoulder 84 formed on the body. Above the shoulder 84 the inner side edges of the locking members are engaged with a flat surface 85 on the body. The locking bar 60 has an upper edge 86 engaged in all of the notches 81. Adjacent its lower edge the bar 60 is provided at its inner part with a slanting surface 87 engaging a correspondingly shaped surface at the side of the body. The arrangement is such that, as the screws 62 are screwed into their sockets, the bar 60 is forced downwardly to a slight extent by engagement with the sloping surface on the body, thereby pulling that side of the grid downwardly so as to hold the screen tightly in its seat and prevent leakage of rubber in the region of the screen margin.

At the right-hand side of the body (Fig. 5), the locking members carried by the grid have the same formation as above described, but their coaction with the body and with the bar 61 is somewhat different. The projections 79 of the locking members engage in this case directly against a shoulder 88 provided on the side of the body, the lower parts of the locking members being disposed below this shoulder, and the upper parts of the locking members engaging a flat surface on the body similar to the surface 85. It will be evident that, as the locking members directly engage the horizontal surface provided by the shoulder 88, the grid is held in place so that it is impossible for it to move upwardly. In this case also the notch 81 is not engaged by the clamping bar, but the latter, on the other hand, has an upper edge portion 90 fitting into the notches 82 of the locking members. At the lower part the bar 61 has a squared-off inner edge 91 abutted against a flat face 92 formed on the body. It will be understood, therefore, that as the screws 63 are screwed inwardly into their sockets, the lower part of the bar is brought up against the face 92, and the upper part is forced against the locking members, thereby holding them firmly in engagement with the shoulder 88.

The knife cage F is preferably rotated from the electric motor G by means of gear connection, including, for example, a pinion 93 carried by the motor shaft and engaging a ring gear 94 fastened in a suitable manner to the cage ring 39. The inner curvature of the ring 39 conforms closely to the outer curvature of the grid, but below the grid the strainer chamber structure is spaced from the ring 39 to provide suitable clearance, as appears from Fig. 5. The blades of the knives do not need to make actual contact with the grid, but the cutting edges are quite close to the grid surface as the knives revolve.

It is believed that the operation of the machine will be obvious for the most part from the preceding description. The body of rubber is forced into the chamber of the strainer section by the feed screw, and within the strainer chamber the feed screw forces the rubber outwardly through the window covered by the screen. The screen retains the dirt and foreign particles within the chamber. The rubber, on the other hand, passes outwardly through the grid and is cut off by the knives as it emerges from the grid openings. The grid openings are preferably formed to provide slots, as above described, and hence the issuing rubber tends to form a plurality of sheets or strips extending transversely to the straining chamber. The revolving knives will cut the emerging strips or incipient sheets. In a machine such as described, the strips of ¼ inch thickness will be cut into short lengths, say ¼ inch, but this is mentioned only by way of example. It is obvious that it is possible to give the knife cage rotation speed considerable variation with respect to the speed of rotor rotation. The product formed by the machine shown is a strip or string such as shown in Fig. 5A, but this is only by way of example.

It will be obvious from the foregoing description how the grid structure is assembled on the casing of the strainer section. As the feed screw rotates, the rubber is forced out of the chamber through an opening which takes up in this particular case only 120° of the chamber circumference. As will be evident from Fig. 5, the rubber can pass out of the chamber in a widening stream and can fill the space defined by the slanting side surfaces of the window. Before the body of rubber reaches the screen it can widen out, and after it passes through the screen it can continue to widen as it moves toward the outer surface of the grid. As the rubber emerges from the slots of the grid it is cut off, and the cut pieces will be stripped off as they are cut by the revolving knives, and will fall to a lower location where they can be picked up and disposed of in a convenient manner.

The temperature of the rubber or other material being treated can be controlled to some extent by circulation of a fluid of proper temperature. For this purpose the feed screw is preferably hollow and has a fluid passage extending through it. It will also be noted that in the form shown the strainer casing is provided with passages for fluid, two of these passages being longitudinal passages 95, 96 located in the lower thick wall of the strainer chamber.

When a screen becomes clogged, and for this or any other reason requires replacement, the replacement can be effected very easily. For accomplishing this, the clamping bar 60 can be removed from the side of the strainer casing by removing its fastening screws. The grid can thereupon be readily swung upward to a position such as indicated by the dotted lines in Fig. 6, in which position the screen is easily accessible so that it can be readily pried out of its seat and removed for the substitution of a new screen. After the new screen has been placed in position, the grid and the other holding parts are restored to their clamping positions. It will be understood that for obtaining access to the clamping bar 60 it will be necessary to have the cutting knives out of the way, and they can be readily moved to a clearing position, such, for example, as that shown in Fig. 5. After this, the knives will be moved again and will take a position in which they are in a substantially horizontal plane so as to permit the grid to be swung to the elevated position. By providing the knife cage with two knives, placed in the manner shown, the cage can be readily shifted to permit the operations described above.

It will be seen that the invention involves the treatment of rubber or similar material in a forcing machine having a forcing screw or feeding screw which involves placing a screen over a window in the cylindrical wall of the forcing chamber, then clamping the screen tightly in place by applying over it a holding grid, and then using the feed screw to extrude the material through the screen and the grid. Preferably, also, the material is cut as it emerges from the grid, as has been described above, this being accomplished by rotating a knife cage so that the knives move around the forcing chamber and over the grid. When a new screen is to be installed, the knives are moved so as to clear the clamping means for the grid, and thereafter the knives are moved to a position permitting the grid to be moved outwardly with reference to the axis of the screw. It will also be noted that in the process of treatment the material is extruded from the cylindrical forcing chamber in the form of a plurality of transverse strips. The strips when cut by the knives are cut along arcs which are of substantially larger radius than the forcing chamber. The middle portion of the grid exterior is substantially closer to the chamber than are the side margins of the grid exterior. The arrangement is such as greatly to facilitate the discharge of the rubber and also the cutting thereof.

In my procedure as described herein, the product is in the form of a string or strip of predetermined length, the length corresponding substantially to the length of the slot through which the rubber is forced and by which the issuing rubber is shaped. In some cases I give these strings a dusting treatment as they issue from the machine so that they will not stick together and can be handled similarly to rubber pellets.

It will be evident from the foregoing that the quick and convenient replacement of the screens which is possible in a machine of the character described is a feature of great importance. The provisions for cutting off the emerging strips of material are also of great advantage. The machine is of simple, compact structure, and the ready accessibility of the parts is a further feature of advantage. The provisions for preventing leakage of the material around the margin of the screen have already been mentioned.

Various changes in the procedure described and in the organization of parts and detailed structure can be made without departing from the principles of the invention or the scope of the claims.

What I claim is:

1. In a rubber-treating machine, the combination of a main section casing, a supplemental section casing connected to the end of the main section casing, a rotary feed screw disposed in the first casing and extended into the second casing, the second casing presenting a substantially cylindrical chamber, said chamber being provided over a part of its circumference with a longitudinally extending opening or window, a screen over said window through which the material is forced by the screw, a grid extended over the screen comprising a plurality of transversely extending curved strips having inner edges presented against the screen and defining between them transversely disposed slots through which the material is forced by the feed screw, said screen and said strips being curved on arcs of greater radius than said chamber, said grid also including depending locking members arranged exteriorly of the second casing section at opposite sides, clamping bars engaging said locking members and secured to the supplemental section casing and holding the transverse members of the grid in place over the screen, and a knife cage adapted to rotate about an axis positioned below the axis of the feed screw and carrying knives sweeping over the transverse strips of the grid for cutting the emerging material into short lengths.

2. In a rubber-treating machine, the combination of a horizontal rotary feed screw, a casing having a chamber in which said feed screw is disposed, said casing being provided over a part of the upper chamber circumference with a longitudinally extending rectangular window, a screen over said window through which the material is forced by the screw, a grid extended over the screen which shapes the issuing rubber, said grid including a plurality of strip members transverse to the screw axis and also including depending locking members arranged at the sides of the casing, and means cooperating with said locking members for attaching the grid removably to the casing.

3. In a rubber-treating machine, the combination of a rotary feed screw, a casing having a chamber in which said feed screw is located and which is substantially concentric with respect to said feed screw, said casing having a discharge opening in the form of a window through its side wall, a curved grid over said opening for shaping the cross section of the issuing rubber, and cutting knives operating over the grid, said grid being movable outwardly with reference to the screw axis when the knives are in a predetermined position, said cutting knives being mounted in a rotary frame having an opening in which said grid can move.

4. In a rubber-treating machine, the combination of a main section casing, a supplemental section casing attached to the end of the first casing and having a closed head at the remote end, said supplemental section casing being adapted to discharge material through a longitudinally extending window in its side wall, a feed screw operating in the first casing and having an extended free end portion operating in the second casing, and means associated with the screw periphery adjacent the end of the first casing affording a centering bearing for the screw in the discharge portion of the first casing, the discharge end of the screw being spaced from said closed head.

5. In a rubber-treating machine, the combination of a main section casing, a supplemental section casing, a rotary feed screw operating in the first casing and extended into the second casing, the second casing having peripheral discharge openings, a knife cage for cutting off the discharging rubber rotating on an axis eccentric to the feed screw, said discharge openings being at the upper part only of the second casing and the knife cage axis of rotation being at a substantial distance below the feed screw axis, the knife cage operating over a surface disposed on a curve struck from a center coinciding with the knife cage axis, and a screen disposed adjacent the inner ends of the discharge openings.

6. In a rubber-treating machine, the combination of a rotary feed screw, a casing having a chamber enclosing said screw, said casing having a peripheral discharge, a grid over the discharge positioned so that it can be moved outwardly with reference to the axis of the feed screw, and a rotary knife mechanism operating over the outer portion of the grid, said grid being hinged at one side to swing outwardly and the knife mechanism comprising knives spaced apart at such intervals as to permit movement of the knife mechanism to grid-clearing position.

7. In a rubber-treating machine, the combination of a rotary feed screw, a casing having a chamber in which said feed screw is disposed, said casing being provided with a window-like discharge opening in its side wall, a grid over said opening comprising a plurality of parallel transverse members defining elongated narrow rubber-shaping slots, said grid also including depending locking members arranged at the sides of the casing adapted to interlock with the sides of the casing, and clamping bars cooperating with the locking members for attaching the grid removably to the casing.

8. In a rubber-treating machine, the combination of a rotary feed screw, a casing having a chamber in which said feed screw is located and which is substantially concentric with respect to said feed screw, said casing having a discharge opening in the form of a window through its side wall, an arcuate grid over said window disposed on a radius substantially larger than that of the chamber, said grid having its exterior middle portion substantially closer to the chamber than are the exteriors of its side margins, a screen positioned under the grid and a revoluble cutting knife sweeping over the external part of the grid.

9. In a rubber-treating machine, the combination of a rotary feed screw, a casing having a cylindrical chamber in the upper part thereof in which said feed screw is located, said casing having a discharge window in the upper part of the chamber which is elongated longitudinally of the chamber and has substantially parallel sides, a curved grid extending over said window having substantially parallel sides, said grid being curved on an arc having its center substantially below the center of said chamber, the sides of said casing being slabbed off adjacent the sides of the grid, a screen positioned under the grid and means located adjacent the slabbed-off sides of the casing for holding the grid in place.

10. In a rubber-treating machine, the combination of a rotary feed screw, a casing having a substantially cylindrical chamber in which the feed screw is disposed, the chamber being provided in a portion of its periphery with a rectangular window, a screen over the window through which the material is forced by the screw, a rectangular grid extended over the screen for holding the screen in place comprising a plurality of strips presenting between them elongated slots extending substantially throughout the width of the window which shape the issuing rubber, and knives rotating about the casing adapted to cooperate with said strips in cutting off the rubber to form strings.

11. In a rubber-treating machine, the combination of a rotary feed screw, a casing having a substantially cylindrical chamber in which the feed screw is disposed, the casing being closed at its lower part but provided at the upper part with a rectangular window extending longitudinally, a screen over the window through which the material is forced by the screw, a rectangular grid extended over the screen for holding the screen in place formed to provide a plurality of narrow slots extending transversely to the screw axis substantially throughout the width of the window whereby the rubber issues from the grid in the form of incipient sheets, and cutting knives revolving about the casing adapted to cut the sheets so as to form strings.

12. In a rubber-treating machine, the combination of a rotary feed screw, a casing having a substantially cylindrical chamber in which the feed screw is disposed, the casing being closed at its lower part but provided at the upper part with a rectangular window extending longitudinally, a screen over the window through which the material is forced by the screw, a rectangular grid extended over the screen for holding the screen in place comprising a plurality of strips creating between them a plurality of transverse slots and presented edgewise against the screen, said strips having arcuate outer surfaces, and cut-off knives traveling over said surfaces and adapted to cut the issuing rubber into strings.

13. In a rubber-treating machine, the combination of a rotary feed screw, a casing having a substantially cylindrical chamber in which the feed screw is disposed, the casing being closed at its lower part but provided at the upper part with a rectangular window extending longitudinally, a screen over the window, a rectangular grid extended over the screen comprising a plurality of separate transverse strips presenting between them narrow slots, the grid also comprising longitudinal rod members passing through said strips at the sides of the grid, depending members attached to said rods adapted to interlock with the external face of the casing, and clamping bars applied to the casing interlocking with said depending members.

14. In a rubber-treating machine, the combination of a rotary feed screw, a casing having a chamber in which said feed screw is located and which is substantially concentric with respect to said screw, said casing having a discharge opening in the form of a rectangular window through its side wall, a curved grid over said opening comprising a plurality of separate transverse slot-forming strips and rods passing through said strips at the sides of the grid, said grid being pivoted to the casing so as to swing on the axis of one of said rods and enable the grid to be swung outwardly, and a rotary cutting-knife mechanism rotatable about the casing comprising a frame having an opening in which the grid can move outwardly.

WILLIAM A. GORDON.

REFERENCES CITED

The following references are of record in the file of this patent:

UNITED STATES PATENTS

| Number | Name | Date |
|---|---|---|
| 592,090 | Harrell | Oct. 19, 1897 |
| 1,071,300 | Dilg | Aug. 26, 1913 |
| 1,195,576 | Garrahan | Aug. 22, 1916 |
| 1,402,672 | Sizer | Jan. 3, 1922 |
| 1,700,565 | Ernst et al. | Jan. 29, 1929 |
| 1,768,365 | MacFarlane | June 24, 1930 |
| 1,952,556 | MacFarlane | Mar. 27, 1934 |
| 2,138,670 | Upton | Nov. 29, 1938 |
| 2,286,405 | Gordon | June 16, 1942 |
| 2,319,859 | Hale | May 25, 1943 |
| 2,370,952 | Gordon | Mar. 6, 1945 |

FOREIGN PATENTS

| Number | Country | Date |
|---|---|---|
| 559,713 | Great Britain | Mar. 2, 1944 |